United States Patent

Wu

[11] Patent Number: 5,496,054
[45] Date of Patent: Mar. 5, 1996

[54] FOLDING COLLAPSIBLE FRAME FOR GOLF CARTS

[76] Inventor: Ching-Chang Wu, No. 35-1, Jin Hsin Street, Tu Cheng Hsiang Taipei Hsien, Taiwan

[21] Appl. No.: 341,118

[22] Filed: Nov. 18, 1994

[51] Int. Cl.⁶ .................................................. B62B 1/12
[52] U.S. Cl. .................. 280/646; 280/655; 280/DIG. 6; 403/102
[58] Field of Search .................................. 280/645, 646, 280/651, 652, 655, 42, DIG. 6, 47.24, 47.26; 403/87, 99, 102, 116

[56] References Cited

U.S. PATENT DOCUMENTS

| | | | |
|---|---|---|---|
| 4,289,326 | 9/1981 | Hawkes | 280/646 |
| 4,946,186 | 8/1990 | Cheng | 280/DIG. 6 X |
| 5,201,540 | 4/1993 | Wu | 280/646 |
| 5,249,822 | 10/1993 | Wu | 280/646 |
| 5,281,044 | 1/1994 | Chen | 280/DIG. 6 X |
| 5,421,604 | 6/1995 | Wu | 280/DIG. 6 X |

Primary Examiner—Margaret A. Focarino
Assistant Examiner—Michael Mar
Attorney, Agent, or Firm—Varndell Legal Group

[57] ABSTRACT

A folding collapsible frame including a main frame, a first bag cradle and a second bag cradle mounted on the main frame at two opposite ends, a handle frame pivotably connected to a handle bracket on the main frame by a connecting block, a locating block fixedly mounted on the handle frame for connection to the first bag cradle to hold the handle frame and the first bag cradle in the respective operative positions. The first bag cradle is turned about a pivot on the main frame, and has a locating bolt transversely disposed at the bottom the locating block has a curved locating groove, which engages with the locating bolt on the first bag cradle to hold the collapsible folding frame in the operative position when the first bag cradle and the handle frame are respectively extended out.

1 Claim, 5 Drawing Sheets

FOLDING COLLAPSIBLE FRAME FOR GOLF CARTS

BACKGROUND AND SUMMARY OF THE INVENTION

The present invention relates to a folding collapsible golf cart, and relates more particularly to a folding collapsible frame for a folding collapsible golf cart.

The frames of regular golf carts are commonly made collapsible so that they can be collapsed to reduce the storage space when they are not in use. FIG. 1 shows a folding collapsible frame for a fold cart according to the prior art, which is generally comprised of an elongated main frame, an elongated handle frame pivotably connected to the front end of the main frame by connecting means, a bag cradle turned about a pivot on the main frame and having a dovetail groove at the bottom, and a sliding block moved on the handle frame and having a dovetail tongue at the top. When the bag cradle is turned from the collapsed horizontal position to the operative vertical position and the handle frame is extended out, the sliding block is moved toward the bag cradle to engage the dovetail tongue into the dovetail groove, causing the handle frame and the bag cradle locked. This structure of folding collapsible frame is not durable in use because the dovetail tongue of the sliding block tends to be damaged easily.

FIG. 2 shows another structure of folding collapsible frame for a golf cart according to the prior art. This structure of folding collapsible frame uses a locating block to releasably lock the handle frame in the extended out position. This structure of folding collapsible frame is not durable in use because the springs which are installed inside the locating block for a locking control will wear with use quickly. Furthermore, because the bag cradle which is mounted on the front end of the main frame near the handle frame is not collapsible, this folding collapsible frame still needs much storage or transportation space when it is collapsed.

It is one object of the present invention to provide a folding collapsible frame for a golf cart which can be conveniently collapsed to reduce its storage space when it is not in use. It is another object of the present invention to provide a folding collapsible frame for a golf cart which is durable in use.

Accordingly to one aspect of the present invention, the folding collapsible frame comprises a main frame, a first bag cradle and a second bag cradle mounted on the main frame at two opposite ends, a handle frame pivotably connected a handle bracket on the main frame by a connecting block, a locating block fixedly mounted on the handle frame for connection to the first bag cradle to hold the handle frame and the first bag cradle in the respective operative positions, wherein the first bag cradle is turned about a pivot on the main frame, having a locating bolt transversely disposed at the bottom; the locating block has a curved locating groove, which engages with the locating bolt on the first bag cradle to hold the collapsible folding frame in the operative position when the first bag cradle and the handle frame are respectively extended out.

According to another aspect of the present invention, the locating block has a projecting portion, which stops against the bottom side of the main frame when the locating bolt of the first bag cradle is engaged into the locating groove on the locating block, and therefore the connection between the locating block and the first bag cradle is ensured.

DETAILED DESCRIPTION OF THE PREFERRED EMBODIMENT

Figure 1:
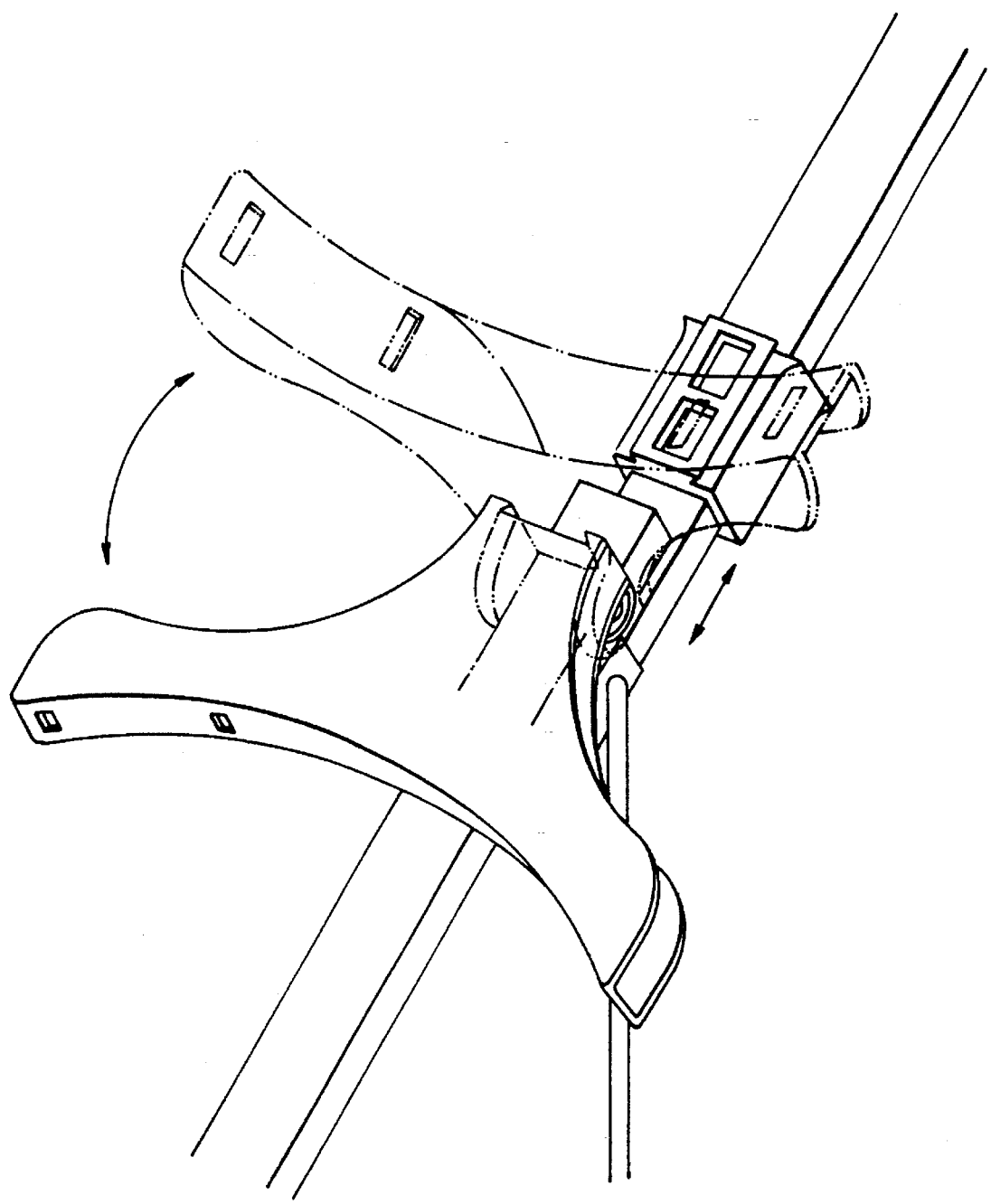
FIG. 1 shows a folding collapsible frame for a golf cart according to the prior art.
Figure 2:
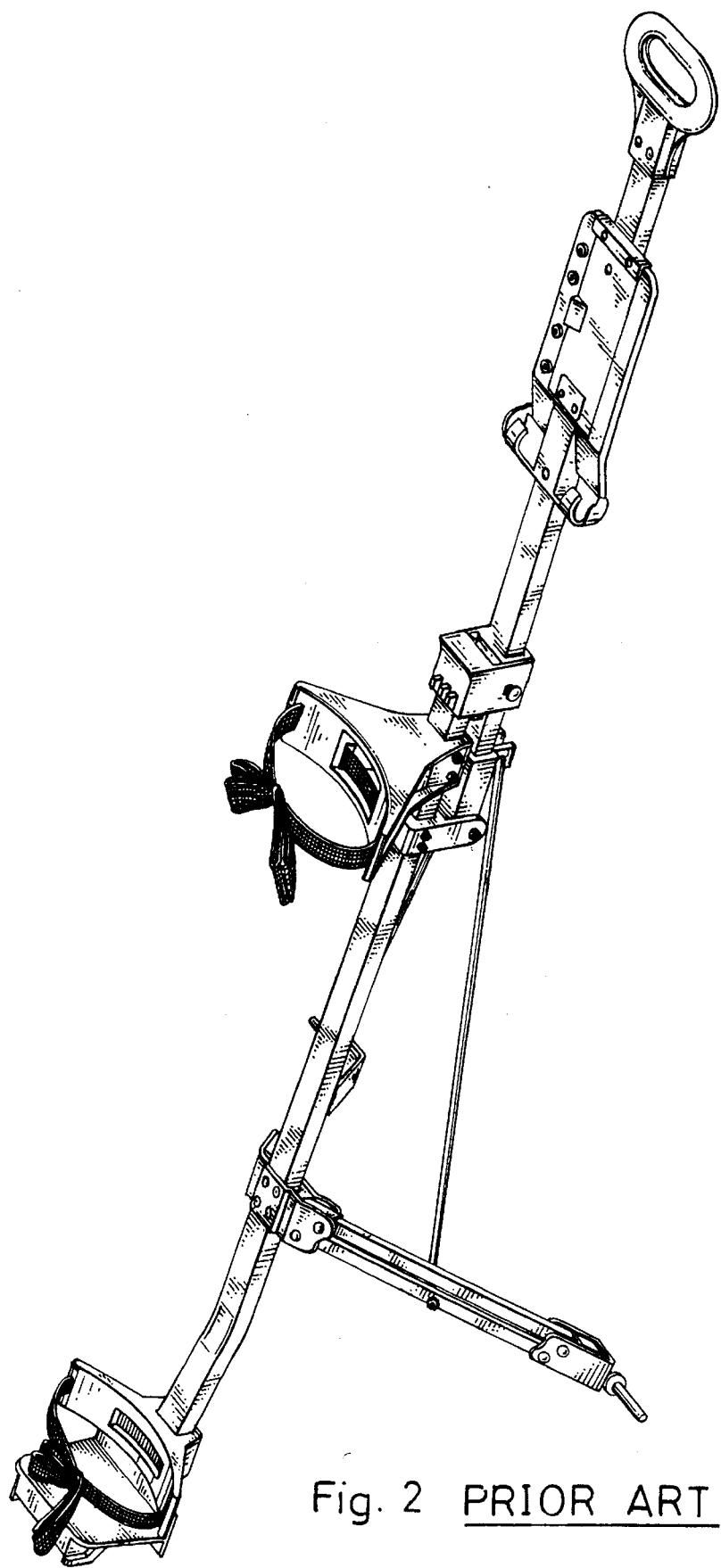
FIG. 2 shows another structure of folding collapsible frame for a golf cart according to the prior art.
Figure 3:
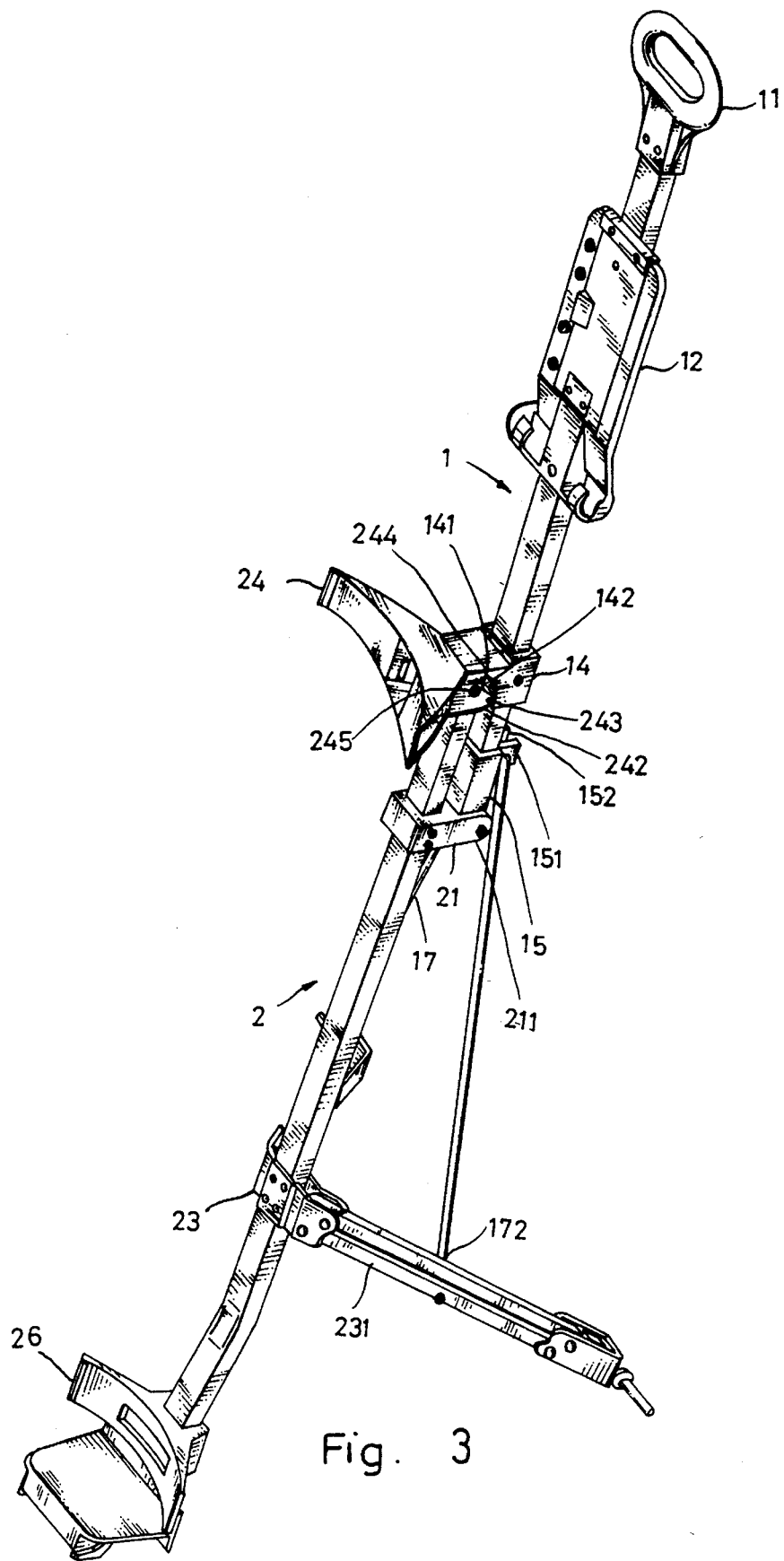
FIG. 3 is an elevational view of a folding collapsible frame for a golf cart according to the present invention.
Figure 4:
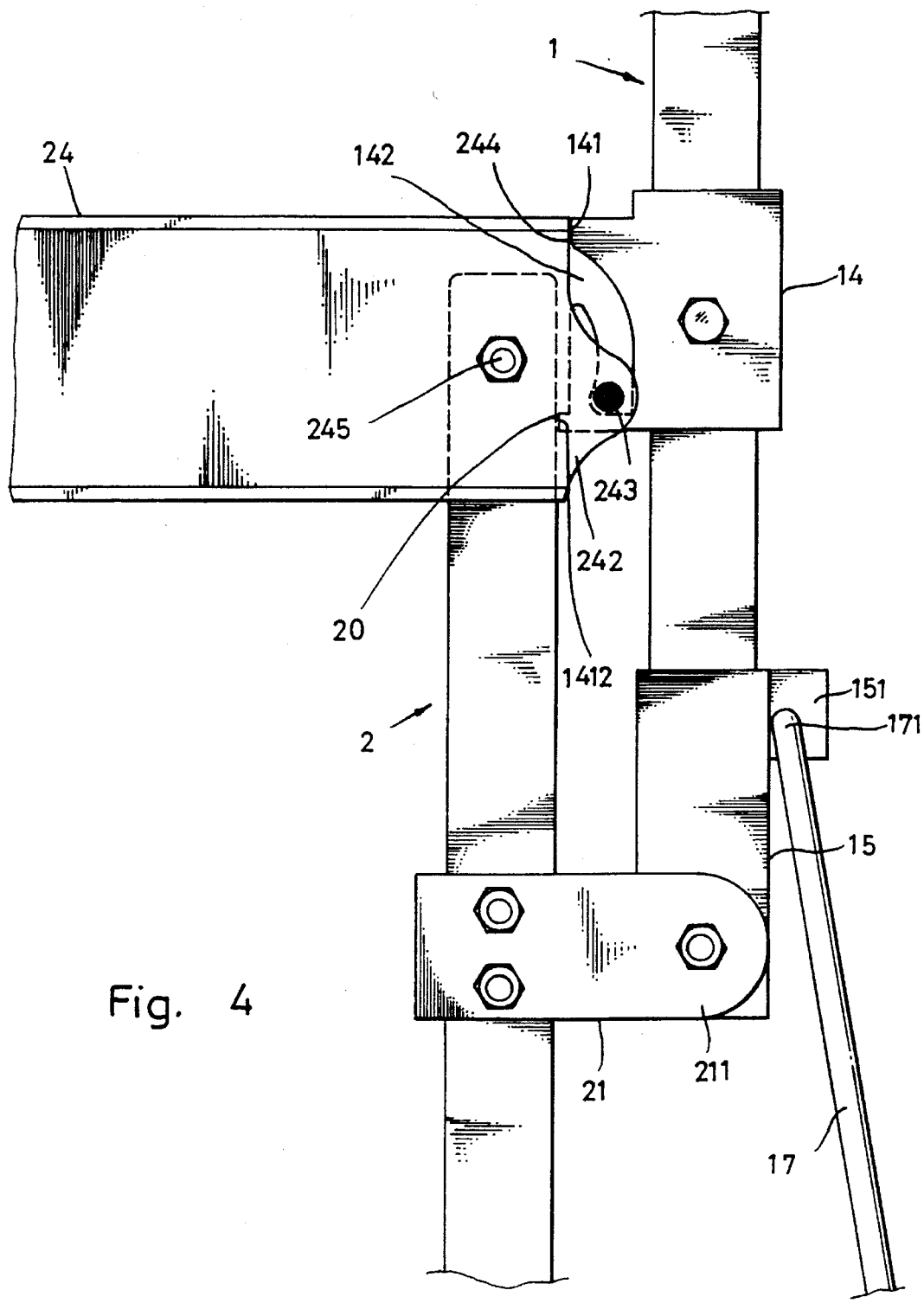
FIG. 4 is a partial view in an enlarged scale showing the folding collapsible frame of FIG. 3 extended out and locked in the extended-out position.
Figure 5:
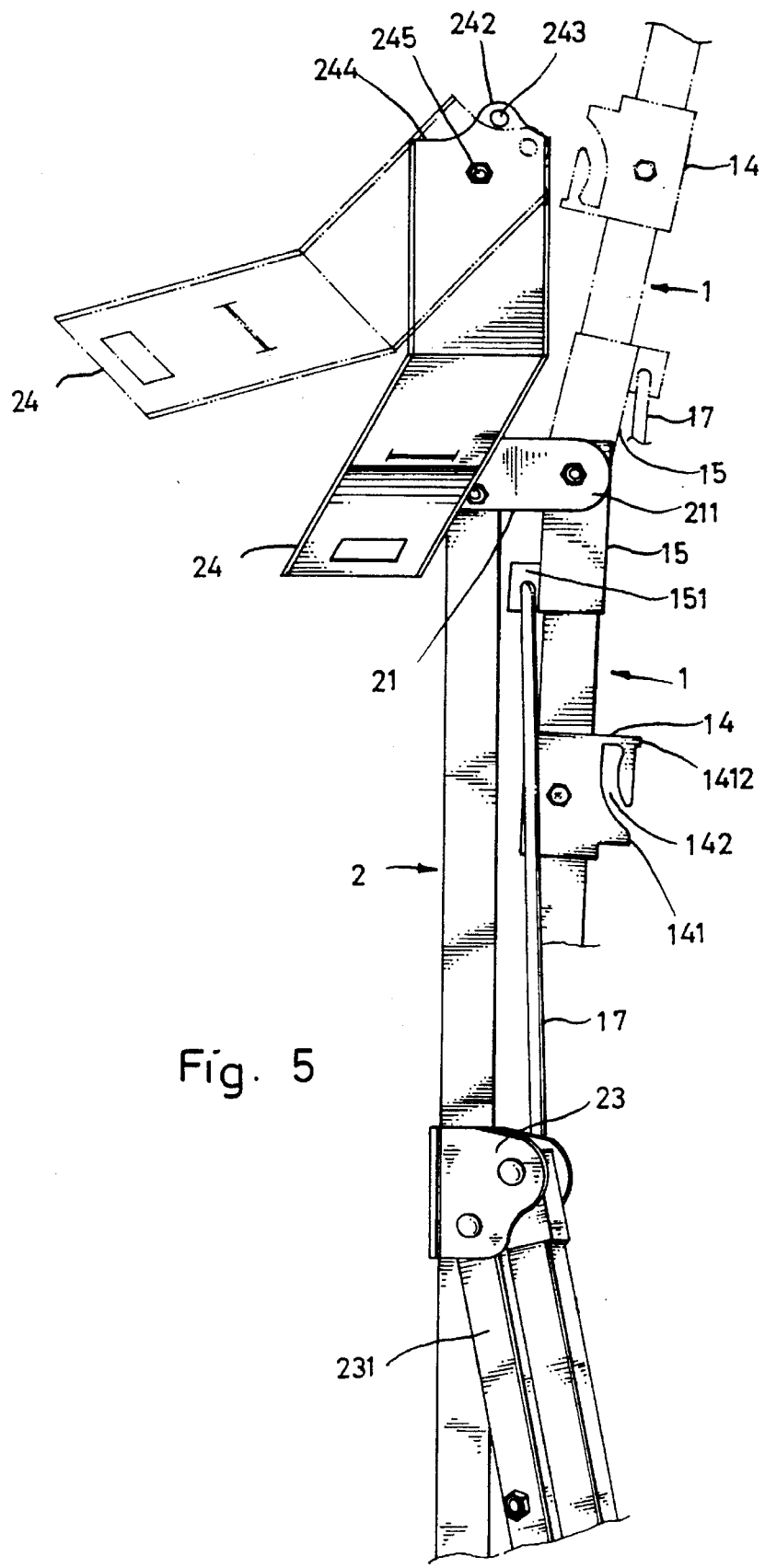
FIG. 5 shows the folding collapsible frame of FIG. 4 collapsed.

Referring to FIGS. 3, 4, and 5, a folding collapsible frame for a golf cart in accordance with the present invention is generally comprised of an elongated handle bar 1, a locating block 14, a connecting block 15, an elongated main frame 2, a handle bracket 21, a wheel holder bracket 23, two links 17, a first bag cradle 24, and a second bag cradle 26.

The handle bar 1 has one end terminating in a hand grip 11, and an opposite end connected to the connecting block 15. A score board 12 is mounted on the handle bar 1 and spaced between the hand grip 11 and the connecting block 15. The locating block 14 is fixedly fastened to the handle bar 1 and spaced between the connecting block 15 and the score board 12. The handle bracket 21 is fixedly fastened to the main frame 2 at a suitable location. The connecting block 15 has one end fixedly fastened to the handle frame 1 and an opposite end pivotably connected between two opposite side wall 211 of the handle bracket 21. The connecting block 15 further has two opposite side strips 151 and 152 respectively pivotably connected to the top ends 171 of the links 17. The first bag cradle 24 and the second bag cradle 26 are respectively mounted on the main frame 2 at two opposite ends. The wheel holder bracket 23 is fixedly mounted on the main frame 2 and spaced between the second bag cradle 26 and the handle bracket 21 to bold a wheel holder 231. The bottom ends 172 of the links 17 are respectively pivotably connected to two opposite sides of the wheel holder 231. The first bag cradle 24 is pivotably connected to the front end of the main frame 2 by a pivot 245.

The main features of the folding collapsible frame is outlined hereinafter with reference to FIG. 3, 4, and 5 again. The locating block 14 comprises a top wall 141, which stops against two opposite bottom edges 244 of the first bag cradle 24 when the handle frame 1 is extended out, a curved locating groove 142 on the top wall 141, which holds the locating bolt 243 on the lugs 242 of the first bag cradle 24 when the handle frame 1 is extended out, and a projecting portion 1412 raised from the top wall 141, which stops against the bottom side 20 of the main frame 2 when the handle frame 1 is extended out. The first bag cradle 24 can be turned about the pivot 245 between a vertical position perpendicular to the main frame 2 and a horizontal position closely attached to the main frame 2, having two lugs 242 respectively extended from two opposite bottom edges 244 thereof, and a locating bolt 243 connected between the lugs 242. When the first bag cradle 24 is turned to the vertical position, namely, the operative position, the locating bolt 243 is fastened to the locating groove 142 to hold the handle frame 1 in the extended out position. When the locating bolt 243 is fastened to the locating groove 142, the top wall 141 and the projecting portion 1412 of the locating block 14 are respectively stopped against the bottom edges 244 of the first bag cradle 24 and the bottom side 20 of the main frame 2. Therefore, the first bag cradle 24 and the handle frame 1 are respectively retained in the respective operative positions (see FIG. 4).

Referring to FIG. 5, when the first bag cradle 24 is turned backwards downwards from the vertical position to the horizontal position to release the locating bolt 243 from the locating groove 142, the handle frame 1 can then be turned backwards to the collapsed position. When the handle frame 1 is turned backwards, the links 17 are forced by the side strips 151 and 152 of the connecting block 15 to turn the wheel holder 231, and therefore the handle frame 1 and the links 17 as well as the wheel holder 231 are collapsed and closely attached to the main frame 2.

I claim:

1. A folding collapsible frame for a golf cart of the type comprising an elongated main frame, a first bag cradle pivotably mounted on one end of said main frame, a second bag cradle fixedly mounted on an opposite end of said main frame, a handle bracket fixedly mounted on said main frame and spaced between said first bag cradle and said second bag cradle, a wheel holder bracket fixedly mounted on said main frame and spaced between said handle bracket and said second bag cradle, a handle frame having one end terminating in a hand grip and an opposite end fixedly fastened with a connecting block, said connecting block having one end fixedly connected to said handle frame and an opposite end pivotably connected to said handle bracket by pivot means, a locating block fixedly mounted on said handle frame for connection to said first bag cradle, a pair of wheel holders pivotably connected to said wheel holder bracket by pivot means, and a pair of links pivotably connected between said connecting block and said pair of wheel holders, wherein said first bag cradle can be pivoted about said pivot means between an extended position perpendicular to said main frame and a folded position extending in a longitudinal direction of said main frame, said first bag cradle having two opposite bottom edges, two lugs respectively extended from said bottom edges, and a locating bolt connected between said lugs of said first bag cradle; said locating block comprises a top wall portion, which abuts against said bottom edges of said first bag cradle when said handle frame is in an extended position, a curved locating groove formed in said top wall portion of said locating block said groove adapted to extend between said lugs for receiving said locating bolt when said handle frame is in said extended position and said first bag cradle is pivoted to the extended position.

\* \* \* \* \*